United States Patent [19]

Ochiumi

[11] Patent Number: 4,792,477
[45] Date of Patent: Dec. 20, 1988

[54] LAMINATE OF MODIFIED POLYCARBONATE RESIN AND MODIFIED POLYOLEFIN RESIN

[75] Inventor: Masahide Ochiumi, Yokkaichi, Japan

[73] Assignee: Mitsubishi Petrochemical Company Limited, Tokyo, Japan

[21] Appl. No.: 108,725

[22] Filed: Oct. 15, 1987

[30] Foreign Application Priority Data

Oct. 16, 1986 [JP] Japan .................. 61-246055

[51] Int. Cl.[4] ............................................. B32B 7/02
[52] U.S. Cl. ............................. 428/216; 156/308.2; 525/67; 525/146; 525/148; 428/215; 428/337; 428/339; 428/412
[58] Field of Search .................. 525/67, 146, 148; 428/215, 216, 412, 337, 339; 156/308.2

[56] References Cited

U.S. PATENT DOCUMENTS

| | | | |
|---|---|---|---|
| 4,444,950 | 4/1984 | Sakano et al. | 525/67 |
| 4,600,648 | 7/1986 | Yazaki et al. | 428/412 |
| 4,720,425 | 1/1988 | Hattori et al. | 428/340 |

*Primary Examiner*—Theodore E. Pertilla
*Attorney, Agent, or Firm*—Oblon, Fisher, Spivak, McClelland & Maier

[57] ABSTRACT

There is provided a thermoplastic resin laminate, comprising a modified aromatic polycarbonate type resin containing (a) functional groups selected from aliphatic hydroxyl groups, carboxyl groups and epoxy groups in a copolymerized form and a modified polyolefin type resin containing (b) functional groups selected from the above group of functional groups and being different from the above functional groups (a) in a copolymerized form, the contents of the functional groups (a) and (b) being each $5 \times 10^{-5}$ to $5 \times 10^{-1}$ mol/100 g.

16 Claims, No Drawings

LAMINATE OF MODIFIED POLYCARBONATE RESIN AND MODIFIED POLYOLEFIN RESIN

BACKGROUND OF THE INVENTION

1. Field of the Invention

This invention relates to a resin laminate having a polycarbonate type resin and a polyolefin type resin firmly adhering to each other, which has excellent mechanical properties, perfume preservability, permeability resistance, chemical resistance, hygienic characteristic, etc.

2. Prior Art

Polycarbonate type resins and polyolefin type resins are both resins well known in the art, and they have been also well known to be used widely for sheets and films.

Although a polycarbonate type resin has excellent mechanical properties, heat resistance, cold resistance, perfume preservability, and hygienic characteristic, it is inferior in permeability resistance, chemical resistance, and environmental stress crack resistance. On the other hand, a polyolefin type resin has excellent permeability and chemical resistance, and hence it has been desired to have a laminate having the advantages of both of the polycarbonate type resin and polyolefin type resin.

For this purpose, because polycarbonate type resins and polyolefin type resins do not have good adhesiveness with each other, various methods for improvement thereof have been proposed in the prior art. For example, the method of using an adhesive has been known. Further, Japanese Patent Publication No. 15464/1985 discloses a multi-layer laminate structure comprising a modified polyolefin layer grafted with maleic anhydride and a polycarbonate layer.

However, these prior art techniques, to the best of our knowledge, have not been fully satisfactory with respect to the molding method and adhesiveness.

SUMMARY OF THE INVENTION

The present invention is intended to provide a solution to the above problem and to accomplish this object by the use of both resins having introduced specific groups.

More specifically, the thermoplastic resin laminate according to this invention comprises a modified aromatic polycarbonate type resin containing (a) functional groups selected from aliphatic hydroxyl groups, carboxyl groups and epoxy groups in the copolymerized form and a modified polyolefin type resin containing (b) functional groups selected from the above group of functional groups and being different from the above functional groups (a) in the copolymerized form, the contents of the functional groups (a) and (b) being each $5 \times 10^{-5}$ to $5 \times 10^{-1}$ mol/100 g.

According to the present invention, in a combination of specific resins of a polycarbonate resin layer and a polyolefin type resin layer, the above problem is solved by interposing specific functional groups between the two layers.

DETAILED DESCRIPTION OF THE INVENTION

Laminate

The laminate of the present invention comprises a specific modified polycarbonate resin layer and a specific modified polyolefin type resin layer.

Modified polycarbonate resin

The polycarbonate type resin to be used in the present invention comprises, in the first place, a basic polycarbonate, which is a polycarbonate or a copolymer thereof, etc. obtained by a known method such as the phosgene method or the ester exchange method, etc. by use of a divalent phenol. The polycarbonate, after the formation reaction of the polycarbonate structure as mentioned above, is ordinarily reacted with a terminal capping agent for capping of the groups existing at the terminal of the polycarbonate structure. The terminal capping agent may be typically a monovalent phenol. For the polycarbonate, commercially available products may be suitably used and, among them, polycarbonates obtained by the use of bisphenol A are preferred for their good mechanical properties and also excellent transparency. Also, copolymers with polyesters, etc. may be used. Further, other resins such as polyolefins, polyamides, polyethylene terephthalate, etc. may be blended.

The modified polycarbonate type resin or its composition constituting one layer of the laminate of the present invention contains the functional groups (a) selected from the group of aliphatic hydroxyl groups, carboxyl groups and epoxy groups in the copolymerized form partially or wholly in the above polycarbonate. As the method for introducing the functional groups (a) into the polycarbonate, it is possible to contemplate (1) the method in which a monovalent phenol or an aliphatic compound such as epichlorohydrin containing the functional groups (a) in the molecule as disclosed in Japanese Patent Publications Nos. 25218/1980, 6547/1961 and 3297/1962 is used in place of or together with monovalent phenol, etc. conventionally used as the terminal capping agent; (2) the method in which a monovalent phenol or an aliphatic compound such as unsaturated carboxylic acid derivative containing precursors of the functional groups (a) in the molecule as disclosed in Japanese Patent Publication Nos. 25076/1973, 33849/1986 and Japanese Unexamined Patent (Khokai) Publication No. 50009/1980, etc. is used as the terminal capping agent to introduce the precursors (e.g., double bonds) followed by conversion to the functional groups (a); (3) the method in which a divalent phenol containing functional groups (a) or precursors thereof in the molecule is used to introduce them into the polycarbonate molecule, etc. Among these, the method of (1) with the use of the terminal capping agent containing the functional groups (a) is preferred because the functional groups can be introduced simply, and also the amount of the groups introduced can be controlled easily. The terminal capping agent to be used when the functional group is hydroxyl group is a monovalent phenol having a substituent comprising alcoholic hydroxyl group, for example, hydroxyphenetil alcohol, particularly p-hydroxyphenetil alcohol.

Modified polyolefin type resin

The modified polyolefin type resin to be used in the present invention comprises, in the first place, a basic polyolefin resin, which is a homopolymer or a copolymer of α-olefin such as ethylene, propylene, butene, hexene, octene, decene, etc. Specifically, for example, polyethylene, polypropylene, ethylene-propylene copolymer, ethylene-butene-1 copolymer, ethylene-4-methylpentene-1 copolymer, propylene-butene-1 copolymer, polybutene-1, copolymer of the above α-olefin with a small amount of diolefin, unsaturated carboxylic acid ester, etc., such as ethylene-butadiene copolymer, propylene-butadiene copolymer, ethylene-vinyl acetate copolymer, ethylene-ethyl acrylate copolymer, and compositions comprising combinations of two or more kinds from these various homopolymers and copolymers can be used.

The polyolefin type resin before modification with the functional groups (b) is preferably a crystalline polyolefin type resin with a crystallinity of more than 20% by X-ray analysis.

The modified polyolefin type resin composition constituting the other layer of the laminate of the present invention contains the functional groups (b) selected from aliphatic hydroxyl groups, carboxyl groups and epoxy groups and different from the above groups (a) partially or wholly in the above polyolefin.

As the method for introducing the functional groups (b) into the polyolefin, there are the method in which a polymerizable monomer containing the functional group (b) is subjected to random, block or graft copolymerization; the method in which a reactive group existing in the polymer molecule in the resin is reacted with a compound containing the functional group (b) or a compound capable of forming the functional group (b) by the reaction; and the method by modification such as oxidation or hydrolysis. Among these, the method by copolymerization or the method by hydrolysis or pyrolysis is preferred because the functional group (b) can be introduced simply and its amount introduced can be controlled with ease. Further, graft copolymerization is preferred with respect to improvement of adhesiveness by introduction of a small amount of functional groups and with respect to no great impairment of the physical properties of the resin used for modification.

As the monomer containing the functional group (b), it can be selected from among those as exemplified below. Examples of the monomer having carboxyl group are acrylic acid, methacrylic acid, maleic acid, itaconic acid, hymic acid (5-norbornene-2,3-di-carboxylic acid) or anhydrides of these, and among these, acrylic acid and maleic anhydride are preferred with respect to adhesiveness. Examples of the monomer having an epoxy group are glycidyl acrylate, glycidyl methacrylate, glycidyl ethacrylate, and glycidyl itaconate, and among these, glycidyl acrylate and glycidyl methacrylate are preferred with respect to reactivity. As for the aliphatic hydroxyl group, it should preferably be introduced by copolymerization with an unsaturated vinyl ester such as vinyl acetate and vinyl propionate, followed by hydrolysis or by copolymerization with an unsaturated alcohol such as monoester of acrylic acid or methacrylic acid with a divalent alcohol.

The modified polyolefin type resin to be used in the present invention is preferably blended with various rubbery polymers as a low crystalline or amorphous elastomer including olefin copolymer rubbers such as ethylene-propylene rubber, ethylene-butene-1 rubber, propylene-butene-1 rubber, ethylene-propylene-diene rubber to improve adhesiveness with the polycarbonate type resin. As the rubbery polymer, in the light of compatibility with the modified polyolefin type resin and the attained improvement in adhesiveness between both the resins, olefin copolymer rubbers are preferred.

The amount of the rubbery polymer to be blended may be 5 to 60 wt. %, preferably 10 to 50 wt. %, on the basis of the total amount, for effect of adhesiveness improvement.

With the modified polyolefin type resin other thermoplastic polymers such as a polyamide and a polyester can be further blended.

In the polycarbonate resin and the polyolefin resin to be used in the present invention, various fillers, additives, pigments, etc. conventionally blended can also be blended.

Content of functional groups

The functional groups contained in the modified polycarbonate type resin or the modified polyolefin type resin are required to be at least $5 \times 10^{-5}$ mol/100 g for mutual adhesiveness, and also less than $5 \times 10^{-1}$ mol/100 g for moldability, physical properties (impact resistance-rigidity balance, etc.) and adhesiveness with unmodified resin of the same kind, preferably $1 \times 10^{-4}$ to $1 \times 10^{-1}$ mol/100 g, particularly preferably $5 \times 10^{-4}$ to $5 \times 10^{-2}$ mol/100 g. Within this range, the modified resin can be used by diluting with the same kind of unmodified resin.

The functional groups to be introduced into the above two kinds of resins constituting the laminate of the present invention are desirably of a combination having probability of chemical reaction mutually between the functional groups contained in the layers laminated and confronting each other. Specifically, for example, (1) a combination of carboxyl groups and the groups selected from epoxy groups and hydroxyl groups, (2) a combination of epoxy groups and hydroxyl groups may be mentioned. Particularly preferable combinations of laminated layers are (1) a combination of a carboxyl-containing polyolefin and a hydroxyl-containing polycarbonate and (2) a combination of a carboxyl-containing polyolefin and an expoxy-containing polycarbonate.

Preparation of Laminate

The laminate of the present invention can be obtained by laminating both modified resins according to a known method. For example, the laminate can be prepared by the method in which both the modified resins are laminated under the molten state such as by pressing, heat sealing, and co-extrusion molding.

The laminate of the present invention is not limited only to the two layer, but also laminates comprising three or more layers containing the two layers as the constituent layers are included. In this case, as the material which can be used for other layers, there are halogen type resins such as vinyl chloride polymer, vinylidene chloride polymer, and vinylidene fluoride polymer; styrene type resins such as acrylonitrile-butadiene-styrene resin and polystyrene; acrylic resins such as polymethyl methacrylate; α-olefin resins such as polyethylene and polypropylene; various rubbers such as acrylonitrile-butadiene rubber and styrene-butadiene rubber; metals such as aluminum and iron; thermosetting resins such as unsaturated polyesters, epoxy resins, and urethane resins; engineering plastics such as thermoplastic polyesters, polycarbonates, and polyamides.

The laminate of the present invention can be caused to adhere to these materials without use of an adhesive or by use of an adhesive, if necessary.

The modified aromatic polycarbonate resin layer and the modified polyolefin resin layer each ordinarily have a thickness of about $10^{-3}$ to 10 mm.

A remarkable feature of the laminate of the present invention is that its layers are firmly bonded to each other and also has excellent perfume preservability, permeability resistance, chemical resistance, etc., as well as good appearance, and this can be prepared easily by a simple molding method.

EXPERIMENTAL EXAMPLES

The following experiments are set forth for describing in more detail the present invention. The interlaminar strength (adhesion) was evaluated according to the following method.

Peel strength:

A laminate was cut into a strip of 1-cm width and, after a part was peeled off, the polycarbonate sheet and the polyolefin sheet were gripped between the chucks of an Instron type tester, and the measurement was conducted at a speed of 10 mm/min.

REFERENCE EXAMPLE 1

3.7 kg of sodium hydroxide was dissolved in 42 liters of water and, while the solution was maintained at 20° C., 7.3 kg of 2,2-bis(4-hydroxyphenyl)propane and 8 g of hydrosulfite were dissolved therein.

To the resultant solution was added 28 liters of methylene chloride, and 177 g of p-hydroxyphenethyl alcohol was added under stirring, which step was followed by blowing of 3.5 kg of phosgene over one hour.

After completion of the blowing of phosgene, the mixture was vigorously stirred to emulsify the reaction mixture. After emulsification, 8 g of triethylamine was added, and stirring was continued for about one hour to carry out polymerization.

The reacted mixture was separated into the aqueous phase and the organic phase, and after neutralization of the organic phase with phosphoric acid, it was washed with water repeatedly until the solution became neutral, which step was followed by addition of 35 liters of isopropanol to precipitate a polymer. The precipitate was filtered and dried to obtain a white powdery polycarbonate resin.

The polycarbonate had a viscosity average molecular weight of $2.5 \times 10^4$, the content of the terminal aliphatic hydroxyl groups being $1.2 \times 10^{-2}$ mol/100 g (hereinafter abbreviated as the modified PCa(A)).

EXAMPLE 1

A 0.5-mm sheet of the modified PCa(A) obtained in Reference Example 1 and each 0.5-mm sheet of a maleic anhydride graft-modified polyethylene (MFR 1 g/10 min., density 0.95 g/cm$^3$, carboxyl group content $2.4 \times 10^{-2}$ mol/100 g) or a composition of 80 parts by weight of a maleic anhydride graft-modified polyethylene and 20 parts by weight of an ethylene-propylene rubber (ethylene content 75 wt. %, Money viscosity$^{100°\ C.}$ 20) (carboxyl group content $8.6 \times 10^{-3}$ mol/100 g) were bonded together at 270° C. by the compression forming method to obtain a laminated sheet of the modified PCa(A) and modified polyethylene resin.

When the T-peel strength of the laminated sheet obtained was measured, it was found to be 0.43 kg/cm in the case of the modified PCa(A) and the modified polyethylene, while it was 4.5 kg/cm in the case of the modified PCa(A) and the composition.

COMPARATIVE EXAMPLE 1

When Example 1 was repeated except for the use of a commercially available polycarbonate ("Iupilon E-2000" produced by Mitsubishi Gas Kagaku K.K.), no bonding occurred at all.

EXAMPLE 2

On each 0.5-mm sheet of the modified polyethylene composition used in Example 1 and the composition of 70 parts by weight of a maleic anhydride graft-modified polypropylene and 30 parts by weight of an ethylene-propylene rubber (ethylene content 75 wt. %, Mooney viscosity$_{1+4}^{100°\ C.}$ 70) (carboxyl group content $6.1 \times 10^{-3}$ mol/100 g), chloroform solutions of the modified PCa(A) used in Example 1 and the polycarbonate used in Comparative Example 1 at various ratios were applied and dried to form coatings each of 100μ.

Each of the two-layer sheets thus obtained and 0.5-mm sheet of a polycarbonate were bonded together and evaluated similarly as in Example to produce the results shown in Table 1.

TABLE 1

| Modified PCa composition | | | Adhesion strength (kg/cm) | |
|---|---|---|---|---|
| Formulation (wt. %) | | OH group | to modified | to modified |
| modified PCa (A) | PCa | content (mol/100 g) | PE composition | PP composition |
| 75 | 25 | $9.0 \times 10^{-3}$ | 4.3 | 1.0 |
| 50 | 50 | $6.0 \times 10^{-3}$ | 3.7 | 0.9 |
| 10 | 90 | $1.2 \times 10^{-3}$ | — | 0.6 |

EXAMPLE 3

On a 0.5-mm sheet of a composition of 70 parts by weight of a maleic anhydride graft-modified polypropylene containing various concentrations of carboxyl groups and 30 parts by weight of the ethylene-propylene rubber used in Example 2, a chloroform solution of 75 wt. % of the modified polycarbonate and 25 wt. % of the polycarbonate used in Example 2 was applied and dried to form a coating of 100μ.

The two-layer sheet thus obtained and 0.5 mm sheet of the polycarbonate were bonded and evaluated similarly as in Example 1 to obtain the results shown in Table 2.

TABLE 2

| Carboxyl content in the modified PP composition (mol/100 g) | Adhesion strength (kg/cm) |
|---|---|
| $2.0 \times 10^{-3}$ | 0.6 |
| $3.1 \times 10^{-3}$ | 1.1 |
| $6.1 \times 10^{-3}$ | 3.6 |
| $1.0 \times 10^{-2}$ | 1.0 |

REFERENCE EXAMPLE 2

A polycarbonate was obtained in the same manner as in Reference Example 1 except for the use of 364 g of 2-(4-hydroxyphenyl)-2-(4-glycidyloxyphenyl)propane in place of 177 g of p-hydroxyphenethyl alcohol used in Reference Example 1. The polycarbonate had a viscosity average molecular weight of $2.4 \times 10^4$, a content of terminal epoxy groups of $1.3 \times 10^{-2}$ mol/100 g (hereinafter abbreviated as the modified PCa(B)).

EXAMPLE 4

Except for the use of the modified PCa(B) obtained in Reference Example 2 and the modified polyethylene composition used in Example 1, bonding was carried out and evaluated as in Example 1. As a result, a T-peel strength of 3.6 kg/cm was obtained.

REFERENCE EXAMPLE 3

A modified polycarbonate was obtained as in Reference Example 1 except for the use of 195 g of p-hydroxyphenylacetic acid in place of p-hydroxyphenethyl alcohol in Reference Example 1. The modified polycarbonate had a viscosity average molecular weight of $2.4 \times 10^4$, a content of terminal epoxy groups of $1.3 \times 10^{-2}$ mol/100 g (hereinafter abbreviated as the modified PCa(C)).

EXAMPLE 5

Except for the use of a composition of 70 parts by weight of a glycidyl methacrylate graft-modified polypropylene and 30 parts by weight of the ethylene-propylene rubber used in Example 2 (epoxy group content $5.3 \times 10^{-3}$ mol/100 g) and the modified PCa(C) obtained in Reference Example 3, bonding was carried out and evaluated as in Example 1. As a result, a peel strength of 2.5 kg/cm was obtained.

EXAMPLE 6

Except for the use of a composition of 70 parts by weight of a 2-hydroxyethyl methacrylate graft-modified polypropylene and 30 parts by weight of the ethylene-propylene rubber used in Example 2 (aliphatic hydroxyl group content $5.7 \times 10^{-3}$ mol/100 g) and the modified PCa(B) obtained in Reference Example 2, bonding was carried out and evaluated as in Example 1. As a result, a peel strength of 1.6 kg/cm was obtained.

What is claimed is:

1. A thermoplastic resin laminate, comprising a modified aromatic polycarbonate resin containing (a) functional groups selected from aliphatic hydroxyl groups, carboxyl groups and epoxy groups in a copolymerized form and a modified polyolefin resin containing (b) functional groups selected from the above group of functional groups and being different from the above functional groups (a) in a copolymerized form, the contents of the functional groups (a) and (b) being each $5 \times 10^{-5}$ to $5 \times 10^{-1}$ mol/100 g.

2. A thermoplastic resin laminate according to claim 1, wherein the modified polyolefin resin contains 5 to 60 wt. % of an elastomer.

3. A thermoplastic resin laminate according to claim 1, wherein the combination of the functional groups (a) and (b) is (i) carboxyl groups and the groups selected from epoxy groups and hydroxyl groups, or (ii) epoxy groups and hydroxyl groups.

4. A thermoplastic resin laminate according to claim 1, wherein the modified aromatic polycarbonate resin is a polycarbonate containing hydroxyl groups and the modified polyolefin resin is a polyolefin containing carboxyl groups.

5. A thermoplastic resin laminate according to claim 1, wherein the modified aromatic polycarbonate resin is a polycarbonate containing epoxy groups and the modified polyolefin resin is a polyolefin containing carboxyl groups.

6. A thermoplastic resin laminate according to claim 1, wherein the aromatic polycarbonate before modification with the functional groups (a) is a polycarbonate in which the divalent phenol for formation of the polycarbonate structure is bisphenol A.

7. A thermoplastic resin laminate according to claim 1, wherein the functional groups (a) are introduced by reacting a terminal capping agent having the functional groups (a) with the polycarbonate before modification with said functional groups (a).

8. A thermoplastic resin laminate according to claim 7, wherein the terminal capping agent is a phenol having a substituent comprising an alcoholic hydroxyl group.

9. A thermoplastic resin laminate according to claim 1, wherein the modified polyolefin resin is an olefinic resin having a carboxyl-containing ethylenically unsaturated monomer graft copolymerized onto said resin.

10. A thermoplastic resin laminate according to claim 9, wherein the carboxy-containing ethylenically unsaturated monomer is maleic anhydride.

11. A thermoplastic resin laminate according to claim 1, wherein the polyolefin resin before modification with the functional groups (b) is a crystalline polyolefin resin with a crystallinity of more than 20% or more by X-ray analysis.

12. A thermoplastic resin laminate according to claim 1, wherein said contents of the functional groups (a) and (b) are realized only with the modified polycarbonate resin and the modified polyolefin resin.

13. A thermoplastic resin laminate according to claim 1, wherein said contents of the functional groups (a) and (b) are realized by blending into the modified polycarbonate resin and the modified polyolefin resin a thermoplastic resin compatible therewith.

14. A thermoplastic resin laminate according to claim 13, wherein said thermoplastic resin is an aromatic polycarbonate.

15. A thermoplastic resin laminate according to claim 14, wherein the aromatic polycarbonate is of the same kind as the aromatic polycarbonate resin before modification with the functional groups (a).

16. A thermoplastic resin laminate according to claim 1, wherein the modified aromatic polycarbonate resin layer and the modified polyolefin resin layer each have a thickness of $10^{-3}$ to 10 mm.

* * * * *